(12) United States Patent
Kojima

(10) Patent No.: US 9,731,611 B2
(45) Date of Patent: Aug. 15, 2017

(54) VEHICLE

(71) Applicant: TOYOTA JIDOSHA KABUSHIKI KAISHA, Toyota-shi, Aichi-ken (JP)

(72) Inventor: Koichi Kojima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 67 days.

(21) Appl. No.: 14/902,175

(22) PCT Filed: May 16, 2014

(86) PCT No.: PCT/JP2014/002599
§ 371 (c)(1),
(2) Date: Dec. 30, 2015

(87) PCT Pub. No.: WO2015/011864
PCT Pub. Date: Jan. 29, 2015

(65) Prior Publication Data
US 2016/0368391 A1    Dec. 22, 2016

(30) Foreign Application Priority Data

Jul. 23, 2013    (JP) .................................. 2013-152438

(51) Int. Cl.
*H02J 7/00* (2006.01)
*B60L 11/18* (2006.01)
*B60L 3/00* (2006.01)

(52) U.S. Cl.
CPC ......... *B60L 11/1818* (2013.01); *B60L 3/0069* (2013.01); *B60L 11/1824* (2013.01);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

2007/0090802 A1*   4/2007   Seo .................... B60L 3/0046
                                                 320/128
2009/0213564 A1*   8/2009   Kakuda ................ B60K 6/365
                                                 361/811
(Continued)

FOREIGN PATENT DOCUMENTS

DE    102010009715 A1    9/2011
EP        2521276 A1    11/2012
JP      2010-264847 A    11/2010

*Primary Examiner* — Arun Williams
(74) *Attorney, Agent, or Firm* — Oliff PLC

(57) ABSTRACT

A vehicle capable of being externally charged, in which a vehicle-mounted power storage device is charged using electric power supplied from a charging cable external to the vehicle, an ECU executes a smart verification process for communicating with an electronic key located within a prescribed verification range and verifying whether the electronic key is an authorized user's key or not, when it is detected that a user has operated a switch for locking the charging cable. When smart verification is impossible, the ECU executes a noise suppression process caused by external charging, and executes the smart verification process during the noise suppression process. When it is determined by the smart verification process during the noise suppression process that smart verification is possible, the ECU switches a state of a lock mechanism of the charging cable.

5 Claims, 6 Drawing Sheets

(52) U.S. Cl.
CPC ....... _B60L 11/1846_ (2013.01); _B60L 2270/14_ (2013.01); _B60L 2270/147_ (2013.01); _H01R 2201/26_ (2013.01); _Y02T 10/7005_ (2013.01); _Y02T 10/7072_ (2013.01); _Y02T 90/121_ (2013.01); _Y02T 90/128_ (2013.01); _Y02T 90/14_ (2013.01); _Y02T 90/16_ (2013.01); _Y02T 90/163_ (2013.01); _Y02T 90/169_ (2013.01); _Y04S 30/14_ (2013.01)

(58) Field of Classification Search
USPC .......................................................... 320/109
See application file for complete search history.

(56) References Cited

U.S. PATENT DOCUMENTS

| | | | |
|---|---|---|---|
| 2010/0010698 A1* | 1/2010 | Iwashita | B60L 3/12 701/22 |
| 2010/0052583 A1* | 3/2010 | Takamatsu | B60L 11/18 318/400.09 |
| 2011/0287649 A1* | 11/2011 | Kurumizawa | B60L 11/1818 439/304 |
| 2012/0238122 A1* | 9/2012 | Hirashita | B60L 11/1818 439/304 |
| 2012/0253715 A1* | 10/2012 | Ohtomo | B60L 11/1816 702/63 |
| 2013/0015951 A1 | 1/2013 | Kuramochi et al. | |
| 2013/0204473 A1 | 8/2013 | Then et al. | |

* cited by examiner

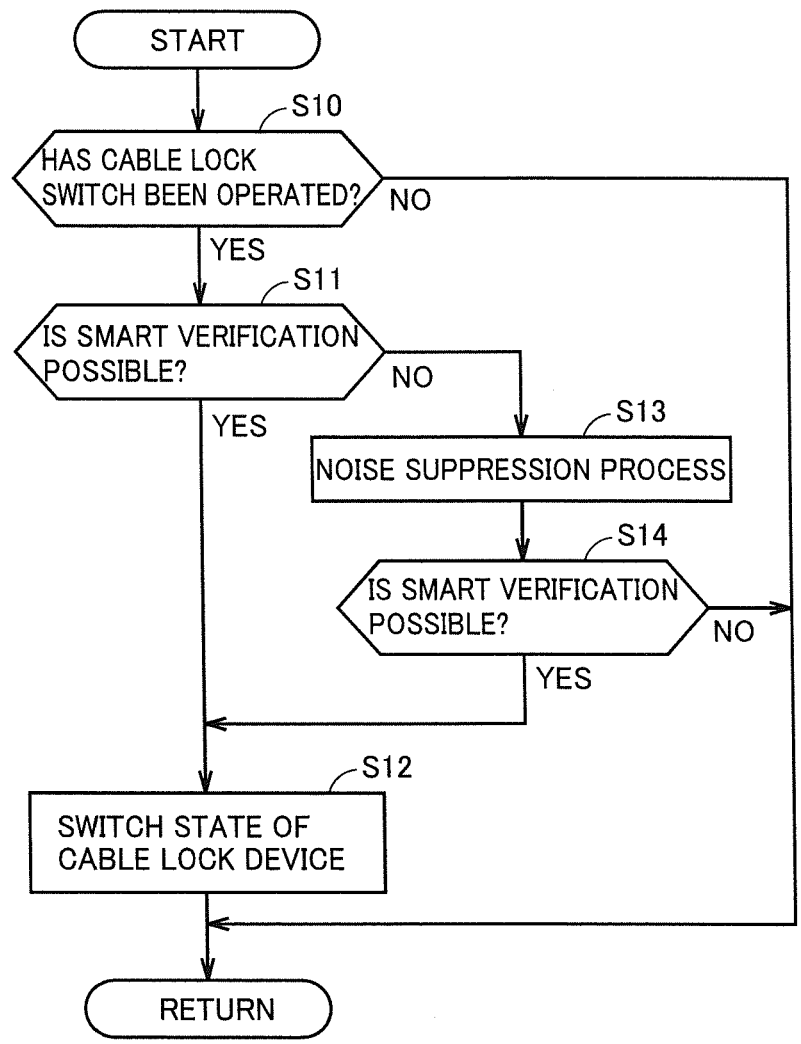

VEHICLE

TECHNICAL FIELD

The present invention relates to a vehicle capable of executing external charging in which a vehicle-mounted power storage device is charged using electric power supplied from a charging cable external to the vehicle.

BACKGROUND ART

Japanese Patent Laying-Open No. 2010-264847 (PTL 1) discloses an externally chargeable vehicle including: an inlet to which a charging cable is connected; a cable lock mechanism capable of switching between a lock state in which the charging cable cannot be removed from the inlet and an unlock state in which the charging cable can be removed from the inlet; and an antenna communicating with an electronic key carried by a user, wherein a state of the cable lock mechanism is switched based on communication between the electronic key and the antenna.

CITATION LIST

Patent Literature

[PTL 1] Japanese Patent Laying-Open No. 2010-264847

SUMMARY OF INVENTION

Technical Problem

However, when the antenna communicating with the electronic key is located near the inlet in the vehicle disclosed in PTL 1, for example, normal communication with the electronic key cannot be carried out due to a noise caused by external charging, and it may become impossible to appropriately switch the state of the cable lock mechanism.

The present invention has been made to solve the aforementioned problem and an object of the present invention is to appropriately switch the state of the cable lock mechanism based on communication with the electronic key.

Solution to Problem

A vehicle according to the present invention is a vehicle capable of executing external charging in which a vehicle-mounted power storage device is charged using electric power supplied from a charging cable external to the vehicle, the vehicle including: an inlet configured to be connectable to the charging cable; a cable lock mechanism provided near the inlet and being capable of switching between a lock state in which the charging cable cannot be removed from the inlet and an unlock state in which the charging cable can be removed from the inlet; a cable lock switch provided near the inlet and outputting a signal for requesting switching of a state of the cable lock mechanism in accordance with user's operation; an antenna provided near the inlet and being capable of receiving a signal from an electronic key located within a prescribed range; and a control device capable of executing a verification process for determining whether a verification condition that the electronic key located within the prescribed range is an authorized user's key is satisfied or not based on information received by the antenna. The control device executes a noise suppression process for suppressing a noise caused by the external charging, when the cable lock switch is operated; executes the verification process during the noise suppression process; and switches the state of the cable lock mechanism when it is determined by the verification process that the verification condition is satisfied.

Preferably, the noise suppression process is a process for reducing a current supplied from the charging cable, and thereby, suppressing the noise generated from a power line between the charging cable and the vehicle.

Preferably, the vehicle further includes a charger provided between the inlet and the power storage device. The noise suppression process includes a process for controlling the charger, and thereby, reducing the current supplied from the charging cable.

Preferably, a relay capable of being opened and closed by the control device is provided on the power line in the charging cable. The noise suppression process includes a process for controlling the relay in the charging cable to be opened, and thereby, preventing the current from flowing between the charging cable and the vehicle.

Preferably, the charging cable includes an oscillation circuit outputting a pilot signal to the control device, the pilot signal being switched to an oscillating state or a non-oscillating state by the control device. The noise suppression process is a process for bringing, into the non-oscillating state, the pilot signal inputted from the oscillation circuit in the charging cable via a control signal line, and thereby, suppressing the noise generated from the control signal line.

Preferably, the control device executes a first verification process when the cable lock switch is operated. The control device switches the state of the cable lock mechanism without executing the noise suppression process, when it is determined by the first verification process that the verification condition is satisfied. The control device executes the noise suppression process when it is determined by the first verification process that the verification condition is not satisfied, and executes a second verification process during the noise suppression process. The control device switches the state of the cable lock mechanism when it is determined by the second verification process that the verification condition is satisfied; and does not switch the state of the cable lock mechanism when it is determined by the second verification process that the verification condition is not satisfied.

Advantageous Effects of Invention

According to the present invention, the state of the cable lock mechanism can be appropriately switched based on communication with the electronic key.

BRIEF DESCRIPTION OF DRAWINGS

FIG. 7 is a flowchart showing a process procedure executed by an ECU.

DESCRIPTION OF EMBODIMENTS

Figure 1:
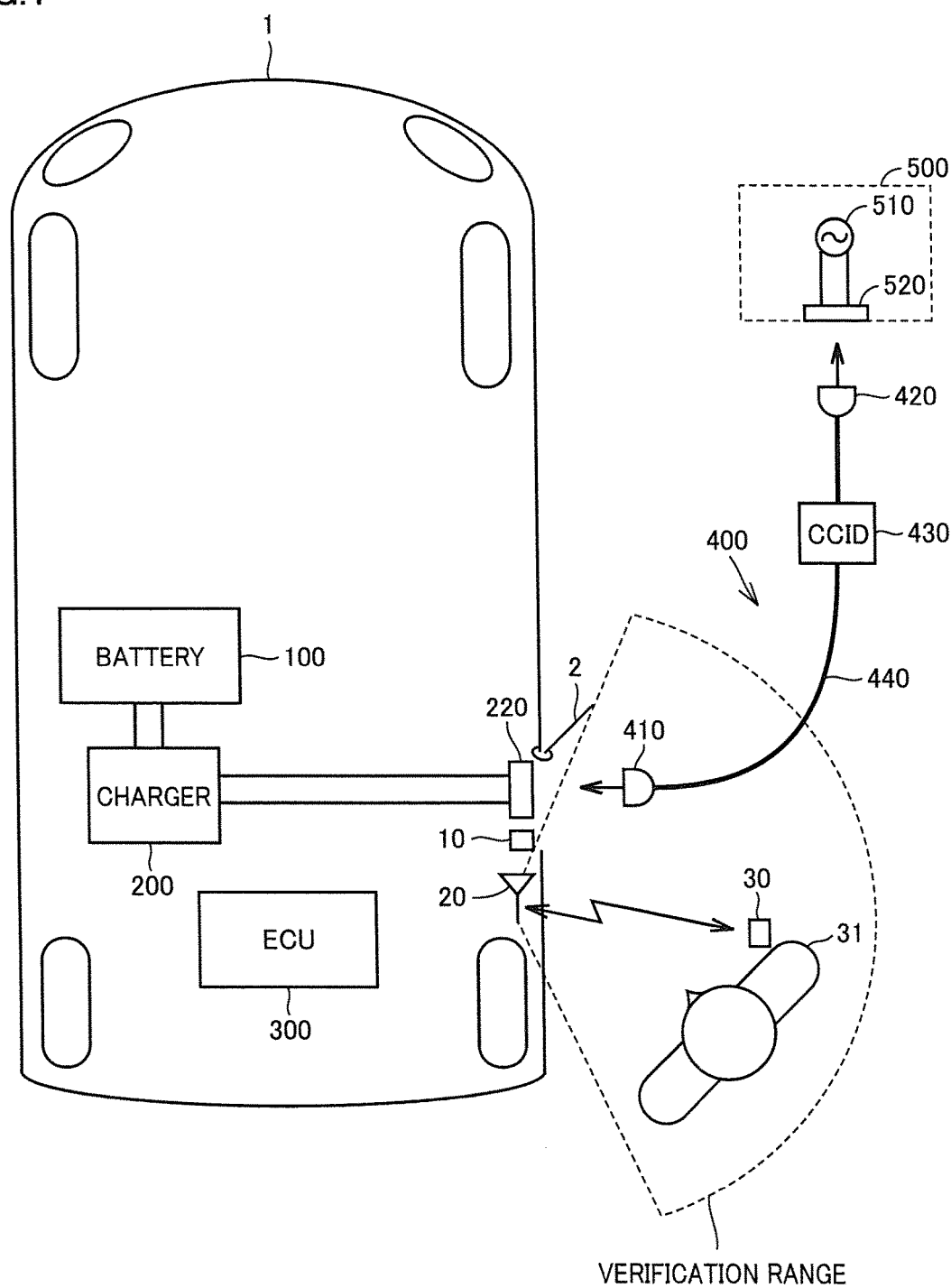
FIG. 1 is an overall block diagram of a vehicle.

Embodiments of the present invention will be described hereinafter with reference to the drawings. In the following description, the same components are denoted by the same reference characters. Their names and functions are also the same. Therefore, detailed description about them will not be repeated.

FIG. 1 is an overall block diagram of a vehicle 1 according to an embodiment of the present invention. Vehicle 1 travels by driving a not-shown motor for traveling with electric power stored in a battery 100. It should be noted that the present invention is applicable to at least electric-powered vehicles in general (such as electric vehicles, fuel cell vehicles and hybrid vehicles) that can obtain driving force from the electric power.

Vehicle 1 includes battery 100 that stores direct-current (DC) power for driving the motor for traveling, and an ECU (Electronic Control Unit) 300 that executes control of the vehicle. ECU 300 is a computer including a CPU (Central Processing Unit), a memory and the like therein.

Vehicle 1 is configured to be capable of charging battery 100 by using electric power (hereinafter also referred to as "external power") supplied via a charging cable 400 from a power supply device (hereinafter referred to as "external power supply device") 500 provided outside vehicle 1. In the present embodiment, the case of the external power being alternating-current (AC) power will be described.

Specifically, vehicle 1 includes an inlet 220 configured to be connectable to a connector 410 of charging cable 400, and a charger 200 arranged between inlet 220 and battery 100. In the present embodiment, inlet 220 is arranged on a rear side surface of a vehicle body. Charger 200 converts the external power (AC power) received by inlet 220 into the electric power (DC power) with which battery 100 can be charged, and outputs the electric power to battery 100. Circuit configurations of external power supply device 500 and charging cable 400 will be described in detail later.

A cable lock switch 10 is provided near inlet 220 (at a position adjacent to inlet 220). Cable lock switch 10 outputs a request for switching between fixation (lock) and release of fixation (unlock) of connector 410 and inlet 220 to ECU 300 in accordance with user's operation.

During the normal time, inlet 220 and cable lock switch 10 are covered with a charging lid 2. When charging lid 2 is opened, a user can connect connector 410 of charging cable 400 to inlet 220, or operate cable lock switch 10.

An antenna 20 for carrying out communication between ECU 300 and an electronic key (smart key) 30 that can be carried by a user 31 is further provided near inlet 220. When electronic key 30 is located within a range in which communication by antenna 20 is possible (hereinafter referred to as "verification range". Refer to a dotted line in FIG. 1), ECU 300 can communicate with electronic key 30 by using antenna 20. However, when electronic key 30 is not located within the verification range, ECU 300 cannot communicate with electronic key 30.

Based on information received by antenna 20, ECU 300 executes a process for determining whether a verification condition that electronic key 30 located within the verification range is an authorized user's key is satisfied or not (hereinafter also referred to as "smart verification process"). Specifically, ECU 300 sends a request signal from antenna 20 at a prescribed timing. When electronic key 30 located within the verification range receives the request signal, electronic key 30 returns a response signal that can specify its own prestored ID code. When ECU 300 receives the response signal before a prescribed time period is elapsed from transmission of the request signal, ECU 300 verifies an ID code specified by this response signal against the preregistered ID code. When both ID codes match with each other, ECU 300 determines that "smart verification is possible" (electronic key 30 is the authorized user's key). On the other hand, when the ID code specified by the response signal and the preregistered ID code does not match with each other, or when ECU 300 does not receive the response signal before the prescribed time period is elapsed from transmission of the request signal, ECU 300 determines that "smart verification is impossible". This smart verification process may be common to a verification process used in switching a lock state of doors of vehicle 1.

Figure 2:
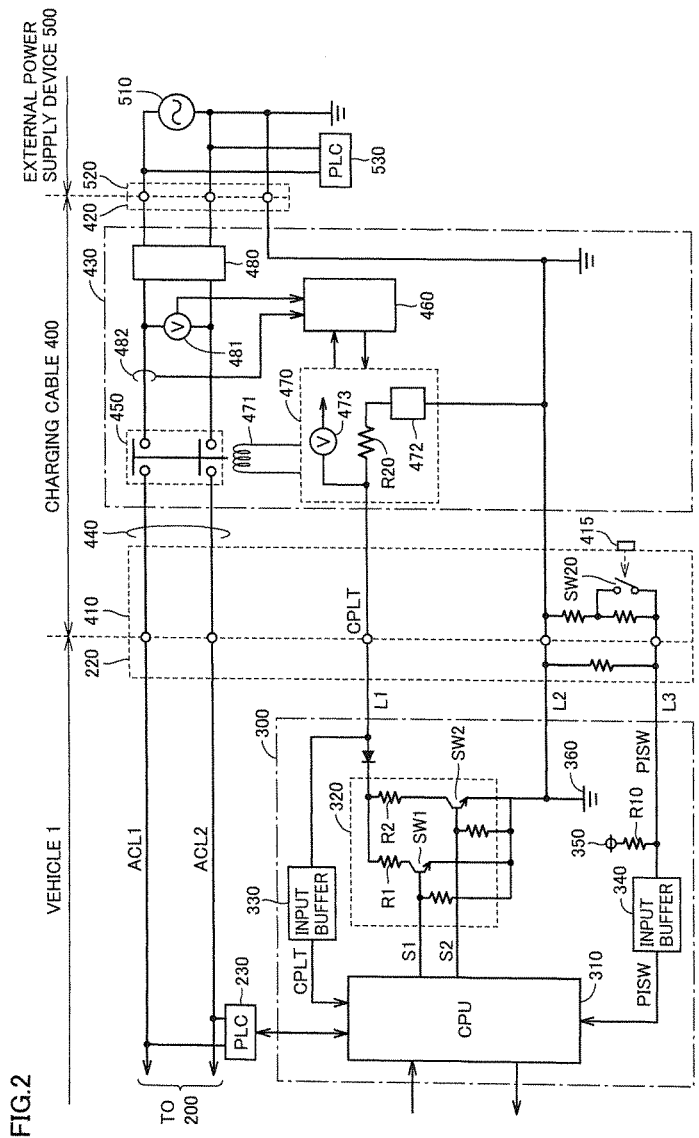
FIG. 2 is a diagram showing circuit configurations of the vehicle, a charging cable and an external power supply device.

FIG. 2 is a diagram showing circuit configurations of vehicle 1 (mainly ECU 300), charging cable 400 and external power supply device 500.

External power supply device 500 includes an AC power source 510, an outlet 520, and a PLC communication unit 530 for carrying out PLC (Power Line Communication).

Charging cable 400 includes connector 410 that can be connected to inlet 220 of vehicle 1, a plug 420 that can be connected to outlet 520 of external power supply device 500, and an AC power line 440 connecting connector 410 and plug 420. A charging circuit interrupt device (hereinafter also referred to as "CCID") 430 for switching between supply and interruption of electric power from external power supply device 500 is inserted in AC power line 440.

Vehicle 1 includes inlet 220, ECU 300, and a PLC communication unit 230 for carrying out PLC communication. PLC communication unit 230 is connected to AC power lines ACL1 and ACL2 connecting charger 200 and inlet 220. PLC communication unit 230 carries out PLC communication with PLC communication unit 530 included in external power supply device 500, via charging cable 400 and AC power lines ACL1 and ACL2. PLC communication unit 230 transmits vehicle information received from ECU 300 to PLC communication unit 530 in external power supply device 500, and receives power supply information transmitted from PLC communication unit 530 and outputs the received power supply information to ECU 300.

ECU 300 receives a signal PISW indicating a connection state of charging cable 400 from connector 410. ECU 300 also receives a pilot signal CPLT from CCID 430 in charging cable 400. As described below, ECU 300 performs the charging operation based on these signals and/or the information received by PLC communication unit 230.

CCID 430 in charging cable 400 includes a CCID relay 450, a CCID control unit 460, a control pilot circuit 470, an electromagnetic coil 471, a leakage detector 480, a voltage sensor 481, and a current sensor 482. Control pilot circuit 470 includes an oscillation device 472, a resistance R20 and a voltage sensor 473.

CCID relay 450 is inserted in AC power line 440 in charging cable 400. CCID relay 450 is controlled by control pilot circuit 470. When CCID relay 450 is open, an electric path in charging cable 400 is interrupted. On the other hand, when CCID relay 450 is closed, electric power is supplied from external power supply device 500 to vehicle 1.

Control pilot circuit 470 outputs pilot signal CPLT to ECU 300 via connector 410 and inlet 220. This pilot signal CPLT is a signal for providing a notification of a rated current of charging cable 400 from control pilot circuit 470 to ECU 300. Pilot signal CPLT is also used as a signal for remotely controlling CCID relay 450 by ECU 300 based on the potential of pilot signal CPLT controlled by ECU 300. Control pilot circuit 470 controls CCID relay 450 based on a change in potential of pilot signal CPLT.

A configuration standardized by, for example, SAE (Society of Automotive Engineers) in the United States of America, Japan Electric Vehicle Association and the like may be used as above-mentioned pilot signal CPLT and connection signal PISW, the shape of inlet 220 and connector 410, the terminal arrangement and the like.

CCID control unit 460 includes a CPU, a memory device and an input/output buffer that are not shown. CCID control unit 460 inputs and outputs signals from/to each sensor and control pilot circuit 470, and controls the charging operation of charging cable 400.

When the potential of pilot signal CPLT detected by voltage sensor 473 is a defined potential V1 (e.g., 12 V), oscillation device 472 outputs non-oscillating pilot signal CPLT. When the potential of pilot signal CPLT is lowered to a potential V2 (e.g., 9 V) lower than above-mentioned defined potential V1, oscillation device 472 outputs pilot signal CPLT controlled by CCID control unit 460 and oscillating at a defined frequency (e.g., 1 kHz) and duty cycle.

The duty cycle of pilot signal CPLT is set based on the rated current that can be supplied from external power supply device 500 to vehicle 1 via charging cable 400.

Based on the duty of pilot signal CPLT received via a control pilot line L1, ECU 300 can sense the rated current that can be supplied to vehicle 1 via charging cable 400.

When the potential of pilot signal CPLT is further lowered to a potential V3 (e.g., 6 V) lower than potential V2 by ECU 300, control pilot circuit 470 supplies a current to electromagnetic coil 471. Upon being supplied with the current from control pilot circuit 470, electromagnetic coil 471 generates electromagnetic force and closes a contact point of CCID relay 450 to bring CCID relay 450 into conduction.

The potential of pilot signal CPLT is controlled by ECU 300. The details will be described below.

Leakage detector 480 is provided within CCID 430 and inserted in AC power line 440 of charging cable 400, and detects presence or absence of leakage. Specifically, leakage detector 480 detects equilibrium of currents flowing through a pair of AC power lines 440 in the directions opposite to each other, and senses occurrence of leakage when the equilibrium breaks. Although not specifically shown, when leakage detector 480 detects leakage, power feeding to electromagnetic coil 471 is interrupted and the contact point of CCID relay 450 is opened to bring CCID relay 450 out of conduction.

When plug 420 in charging cable 400 is inserted into outlet 520, voltage sensor 481 detects a power supply voltage transmitted from external power supply device 500, and provides a notification of the detected value to CCID control unit 460. Further, current sensor 482 detects a charging current flowing through AC power line 440, and provides a notification of the detected value to CCID control unit 460.

A switch SW20 is provided in charging connector 410. Switch SW20 is, for example, a limit switch and a contact point thereof is closed when connector 410 is certainly fitted into inlet 220. When connector 410 is removed from inlet 220, and when connector 410 is not fitted into inlet 220 appropriately, the contact point of switch SW20 is opened. The contact point of switch SW20 is also opened when a push button 415 provided at connector 410 and operated by the user at the time of removing connector 410 from inlet 220 is operated.

In the state in which connector 410 is removed from inlet 220, a voltage signal defined by a voltage of a power supply node 350 and a pull-up resistance R10 included in ECU 300 as well as a resistance provided in inlet 220 is generated as connection signal PISW at a connection signal line L3. In the state in which connector 410 is connected to inlet 220, a voltage signal corresponding to a combined resistance caused by a combination of a plurality of resistances provided in inlet 220 and connector 410 is generated at connection signal line L3 in accordance with the fitting state and the operation state of push button 415.

By detecting a potential of connection signal line L3 (i.e., a potential of connection signal PISW), ECU 300 can determine the connection state of connector 410.

In vehicle 1, ECU 300 further includes a CPU 310, a resistance circuit 320, and input buffers 330 and 340, in addition to above-mentioned power supply node 350 and pull-up resistance R10.

Resistance circuit 320 includes pull-down resistances R1 and R2, and switches SW1 and SW2. Pull-down resistance R1 and switch SW1 are serially connected between a vehicle earth 360 and control pilot line L1 via which pilot signal CPLT is communicated. Pull-down resistance R2 and switch SW2 are also serially connected between vehicle earth 360 and control pilot line L1. In accordance with control signals S1 and S2 provided from CPU 310, switches SW1 and SW2 are controlled to be brought into or out of conduction, respectively.

This resistance circuit 320 is a circuit for controlling the potential of pilot signal CPLT from the vehicle 1 side.

Input buffer 330 receives pilot signal CPLT of control pilot line L1, and outputs received pilot signal CPLT to CPU 310. Input buffer 340 receives connection signal PISW from connection signal line L3 connected to switch SW20 in connector 410, and outputs received connection signal PISW to CPU 310. A voltage is applied to connection signal line L3 by ECU 300 as described above, and when connector 410 is connected to inlet 220, the potential of connection signal PISW changes. CPU 310 detects this potential of connection signal PISW, thereby detecting the connection state of connector 410.

CPU 310 receives pilot signal CPLT and connection signal PISW from input buffers 330 and 340, respectively. CPU 310 detects the potential of connection signal PISW, and detects the connection state and the fitting state of connector 410. CPU 310 also senses the oscillation state and the duty cycle of pilot signal CPLT, thereby detecting the rated current of charging cable 400.

Based on the potential of connection signal PISW and the oscillation state of pilot signal CPLT, CPU 310 controls control signals S1 and S2 of switches SW1 and SW2, thereby controlling the potential of pilot signal CPLT. As a result, CPU 310 can remotely control CCID relay 450 (refer to FIG. 3 described below). Thus, electric power is transmitted from external power supply device 500 to vehicle 1 via charging cable 400.

In addition, CPU 310 is configured to be capable of receiving and transmitting a signal from/to PLC communication unit 230 connected to AC power lines ACL1 and ACL2. CPU 310 transmits the vehicle information to external power supply device 500 via PLC communication unit 230, and receives, via PLC communication unit 230, the power supply information transmitted from external power supply device 500.

When the contact point of CCID relay 450 in charging cable 400 is closed, AC power from external power supply device 500 is provided to charger 200, and preparation for external charging is completed. CPU 310 outputs a control signal to charger 200, and thereby the AC power provided from external power supply device 500 is converted into the DC power with which battery 100 can be charged, and the DC power is outputted to battery 100. As a result, external charging of battery 100 is carried out.

Figure 3:
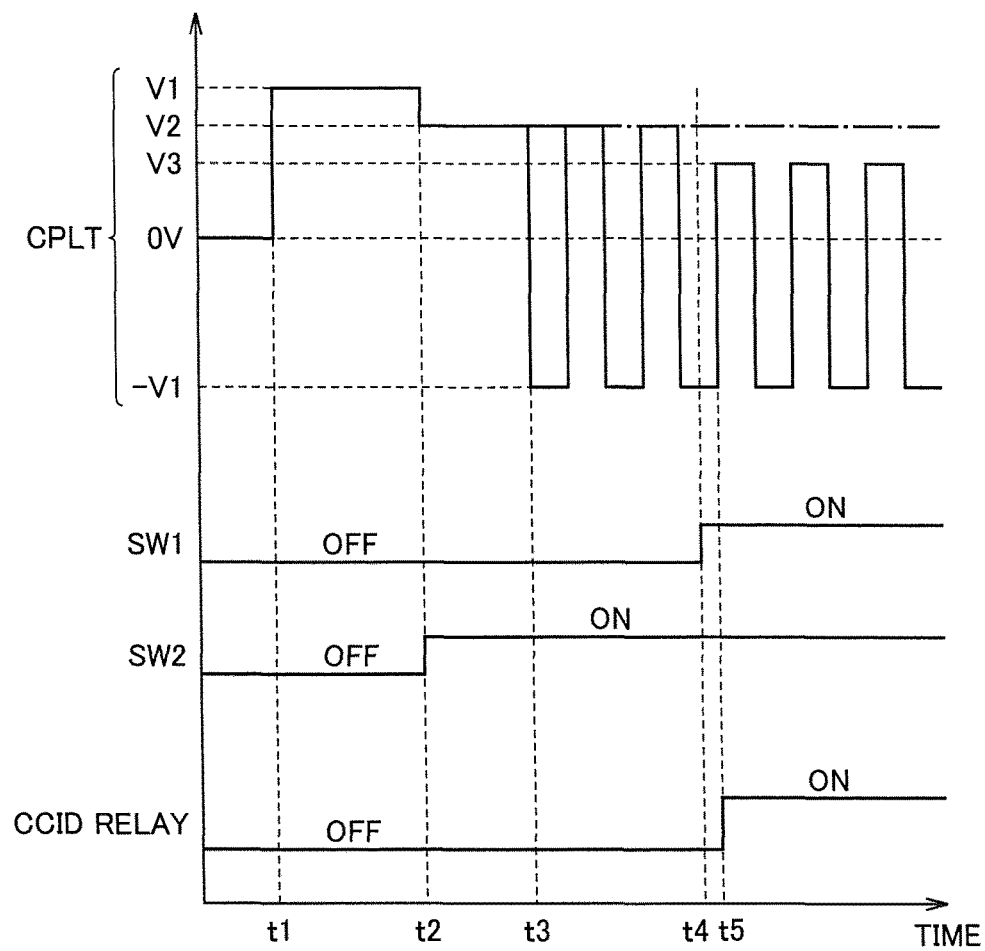
FIG. 3 is a diagram showing a correspondence relationship among states of switches SW1 and SW2, a potential of a pilot signal CPLT, and a state of a CCID relay.

FIG. 3 is a diagram showing a correspondence relationship among states of switches SW1 and SW2, a potential of pilot signal CPLT, and a state of CCID relay 450. In FIG. 3, the horizontal axis represents the time and the vertical axis represents the potential of pilot signal CPLT, the states of switches SW1 and SW2, and the state of CCID relay 450.

Until time t1 comes, charging cable 400 is not connected to both vehicle 1 and external power supply device 500. In this state, switches SW1 and SW2 and CCID relay 450 are OFF and the potential of pilot signal CPLT is 0 V.

At time t1, plug 420 of charging cable 400 is connected to outlet 520 of external power supply device 500. Then, control pilot circuit 470 receives the electric power from external power supply device 500 and generates pilot signal CPLT. It is to be noted that at this time t1, connector 410 of charging cable 400 is not connected to inlet 220. The potential of pilot signal CPLT is V1 (e.g., 12 V) and pilot signal CPLT is in the non-oscillating state.

Thereafter, connector 410 is connected to inlet 220. Then, connection signal PISW is inputted to CPU 310. In response to this input of connection signal PISW, CPU 310 turns on switch SW2. As a result, the potential of pilot signal CPLT decreases to V2 (e.g., 9 V) by pull-down resistance R2 (time t2 in FIG. 3).

When CCID control unit 460 detects that the potential of pilot signal CPLT has decreased to V2, CCID control unit 460 outputs an oscillation command to oscillation device 472 and causes pilot signal CPLT to oscillate (time t3 in FIG. 3).

When CPU 310 detects that pilot signal CPLT has been caused to oscillate, CPU 310 detects the rated current of charging cable 400 based on the duty of pilot signal CPLT. Then, CPU 310 turns on switch SW1 in addition to switch SW2 (time t4 in FIG. 3). As a result, the potential of pilot signal CPLT further decreases to V3 (e.g., 6 V) by pull-down resistance R1 (time t5 in FIG. 3).

When the potential of pilot signal CPLT decreases to V3, the contact point of CCID relay 450 is closed by control pilot circuit 470. As a result, the electric power from external power supply device 500 is transmitted to vehicle 1 via charging cable 400. Thereafter, charger 200 (refer to FIG. 1) is controlled by CPU 310 in vehicle 1, and thereby, external charging of battery 100 is started.

As described above, when switches SW1 and SW2 are both OFF, pilot signal CPLT has potential V1 (e.g., 12 V) and is in the non-oscillating state, and CCID relay 450 is OFF (in the non-conducting state). When switch SW1 is OFF and switch SW2 is ON, pilot signal CPLT has potential V2 (e.g., 9 V) and is in the oscillating state, while CCID relay 450 is OFF. When switches SW1 and SW2 are both ON, pilot signal CPLT has potential V3 (e.g., 6 V) and is in the oscillating state, and CCID relay 450 is ON (in the conducting state).

Figure 4:
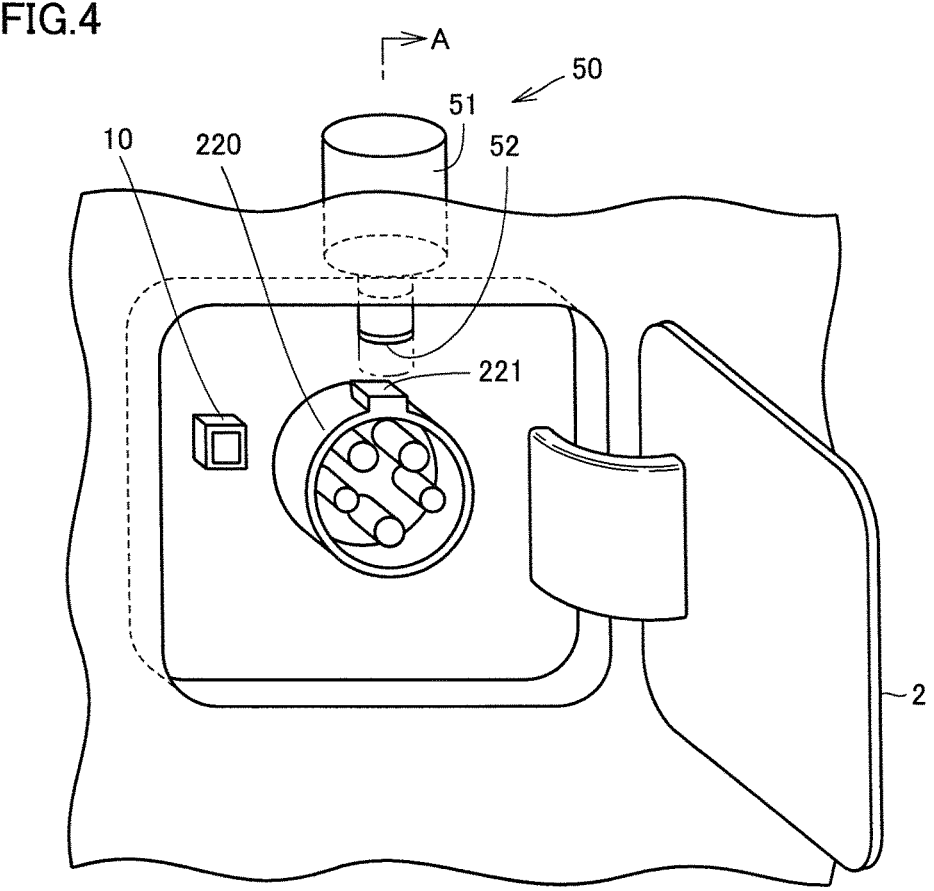
FIG. 4 is a diagram showing a structure around an inlet.
Figure 4:
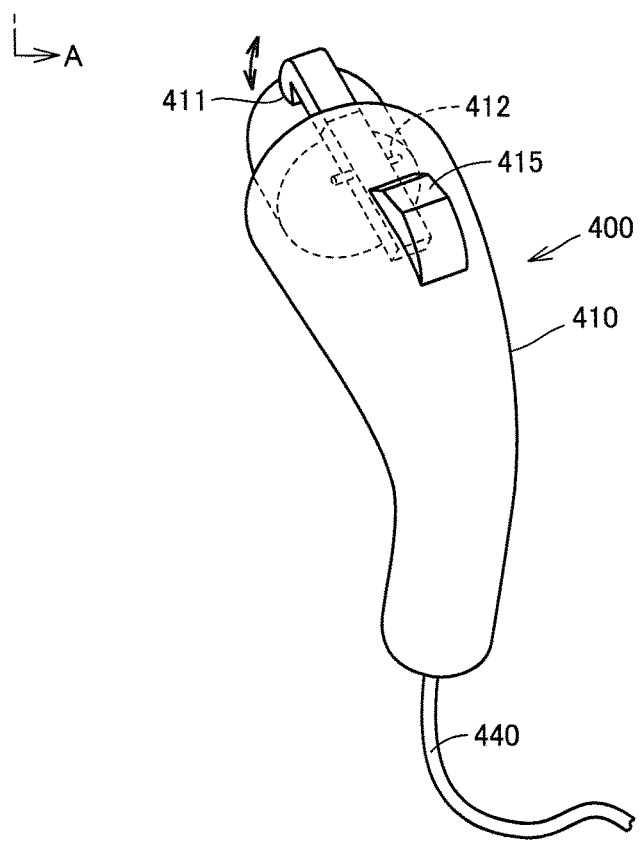
Figure 5:
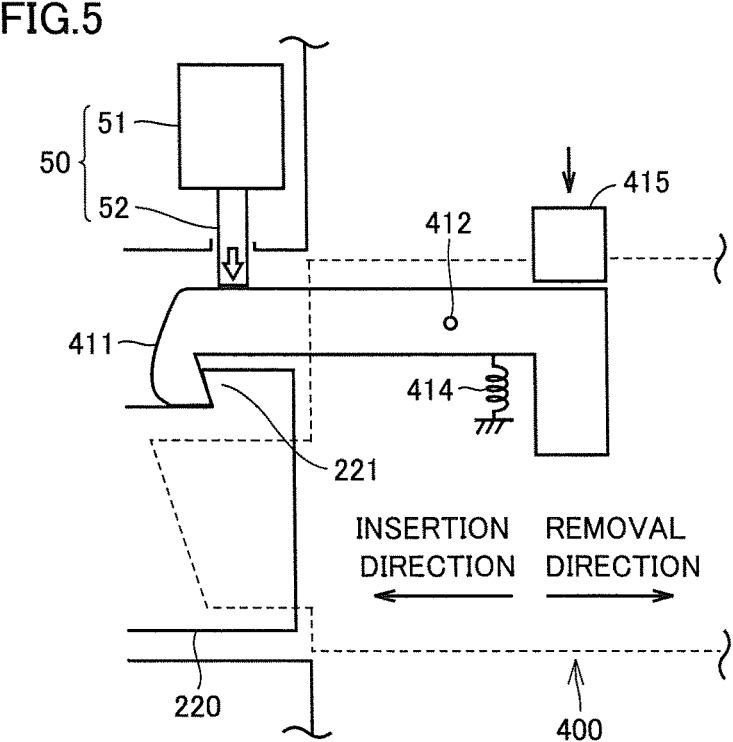
FIG. 5 is a cross-sectional view (No. 1) taken along A-A in FIG. 4.
Figure 6:
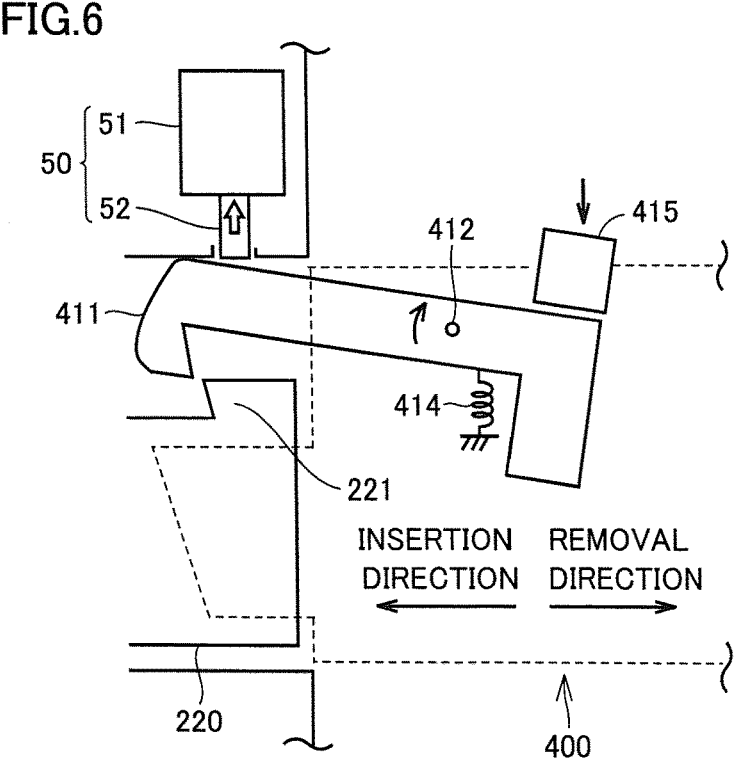
FIG. 6 is a cross-sectional view (No. 2) taken along A-A in FIG. 4.

FIG. 4 is a diagram showing a structure around inlet 220. FIGS. 5 and 6 are cross-sectional views taken along A-A in FIG. 4. A mechanism for connecting and fixing connector 410 and inlet 220 will be described with reference to FIGS. 4 to 6.

Connector 410 of charging cable 400 is provided with a link 411. This link 411 is rotatably attached to the circumference of a shaft 412. One end of link 411 is provided with a convex portion that engages with a protrusion 221 of inlet 220, and the other end thereof is provided with push button 415. Link 411 is elastically biased against a main body of connector 410 by a spring 414 (refer to FIGS. 5 and 6).

When connector 410 is inserted into inlet 220, the convex portion of link 411 engages with protrusion 221 of inlet 220 (refer to the state of link 411 and protrusion 221 in FIG. 5). Therefore, connector 410 cannot be detached from inlet 220.

A cable lock mechanism 50 is provided above inlet 220 (near inlet 220). Cable lock mechanism 50 is configured to be capable of switching between a lock state in which charging cable 400 cannot be removed from inlet 220 and an unlock state in which charging cable 400 can be removed from inlet 220.

Specifically, cable lock mechanism 50 includes a lock bar 52 that slides in the vertical direction, and an electromagnetic actuator 51 that causes lock bar 52 to slide.

In the lock state, lock bar 52 is slid downward and fixed at a position where lock bar 52 comes into contact with the upper surface of link 411 (refer to FIG. 5). As a result, even if push button 415 is pressed, rotation of link 411 is suppressed by lock bar 52, and the convex portion of link 411 does not rise and is not detached from protrusion 221 of inlet 220. In other words, even if the user pushes push button 415, charging cable 400 cannot be removed from inlet 220.

In the unlock state, lock bar 52 is slid upward and fixed at a position where lock bar 52 does not suppress rotation of link 411 (refer to FIG. 6). As a result, since lock bar 52 does not suppress rotation of link 411, link 411 rotates along the circumference of shaft 412 and the convex portion provided at the opposite end rises when push button 415 is pressed. As a result, the convex portion of link 411 is detached from protrusion 221 of inlet 220, and connector 410 can be removed from inlet 220. In other words, when the user pushes push button 415, charging cable 400 can be removed from inlet 220.

When operation of cable lock switch 10 is detected, ECU 300 executes the aforementioned smart verification process and controls cable lock mechanism 50 in accordance with the result of the process. More specifically, when it is determined by the smart verification process that "smart verification is possible", ECU 300 accepts operation of cable lock switch 10 because it is estimated that authorized user 31 is located within the verification range shown in FIG. 1 and has operated cable lock switch 10. When accepting operation of cable lock switch 10, ECU 300 outputs a lock command to actuator 51 when cable lock mechanism 50 is in the unlock state, or outputs an unlock command to actuator 51 when cable lock mechanism 50 is in the lock state.

On the other hand, when it is determined by the smart verification process that "smart verification is impossible", ECU 300 does not accept operation of cable lock switch 10 because it is estimated that a person other than authorized user 31 has operated cable lock switch 10.

As described above, vehicle 1 employs the system for controlling cable lock mechanism 50 based on the result of the smart verification process when operation of cable lock switch 10 is detected. However, in the case of the aforementioned system, there is a concern that the noise caused by operation of charger 200 or CCID 430 during external charging is superimposed on AC power lines ACL1 and ACL2 and control pilot line L1, and due to this, normal communication between the electronic key and antenna 20 provided near inlet 220 cannot be carried out (i.e., the smart verification process cannot be normally executed) and cable lock mechanism 50 is not normally actuated.

Thus, ECU 300 according to the present embodiment executes a process for suppressing the noise generated during external charging (hereinafter referred to as "noise suppression process") when operation of cable lock switch 10 is detected, and controls cable lock mechanism 50 based on the result of the smart verification process executed during the noise suppression process.

FIG. 7 is a flowchart showing a process procedure when ECU 300 controls cable lock mechanism 50. This flowchart is repeatedly executed at a prescribed cycle.

In step (hereinafter, the step will be abbreviated as "S") 10, ECU 300 determines whether cable lock switch 10 has been operated or not. If cable lock switch 10 is not operated (NO in S10), ECU 300 ends the process.

If cable lock switch 10 has been operated (YES in S10), ECU 300 executes the aforementioned smart verification process and determines whether the result thereof is "smart verification is possible" or not (S11).

If smart verification is possible (YES in S11), ECU 300 switches the state of cable lock mechanism 50 (S12). Specifically, as described above, ECU 300 outputs the lock command to actuator 51 when cable lock mechanism 50 is in the unlock state, or outputs the unlock command to actuator 51 when cable lock mechanism 50 is in the lock state.

On the other hand, if smart verification is impossible (NO in S11), ECU 300 executes the noise suppression process (S13).

ECU 300 according to the present embodiment executes any one of the following processes (A) to (C) as the noise suppression process. The noise suppression process may be fixed to any one of the following processes (A) to (C), or the following processes (A) to (C) may be switched as necessary.

(A) Process for Controlling Charger 200 and Reducing External Charging Current In this process, operation of charger 200 is suppressed and an external charging current is reduced. Therefore, the noise superimposed on AC power lines 440, ACL1 and ACL2 due to the operation of charger 200 is suppressed. As a result, the communication noise generated from AC power lines 440, ACL1 and ACL2 (noise provided from AC power lines 440, ACL1 and ACL2 to antenna 20) is suppressed.

(B) Process for Opening CCID Relay 450 in Charging Cable 400 and Interrupting External Charging Current In this process, operation of CCID relay 450 is stopped and the external charging current is interrupted. Therefore, the noise superimposed on AC power lines 440, ACL1 and ACL2 due to the operation of CCID relay 450 is further suppressed. As a result, the communication noise generated from AC power lines 440, ACL1 and ACL2 is further suppressed.

In the present embodiment, the aforementioned process (B) is implemented by ECU 300 switching switch SW1 to the OFF state by remote control. Specifically, during external charging, switches SW1 and SW2 are both ON and the potential of pilot signal CPLT is V3 (e.g., 6 V), and thus, CCID relay 450 is ON. By switching switch SW1 from this state to the OFF state, the potential of pilot signal CPLT changes to V2 (e.g., 9 V), and thus, CCID relay 450 is turned off (refer to FIG. 3). Pilot signal CPLT is, however, maintained in the oscillating state.

(C) Process for Bringing Pilot Signal CPLT into Non-Oscillating State

In this process, pilot signal CPLT is brought into the non-oscillating state, and thereby, the noise superimposed on control pilot line L1 due to operation of CCID 430 (in particular, oscillation device 472) is suppressed. As a result, the communication noise generated from control pilot line L1 (noise provided from control pilot line L1 to antenna 20) is suppressed.

In the present embodiment, the aforementioned process (C) is implemented by ECU 300 switching both of switches SW1 and SW2 to the OFF state by remote control. Specifically, during external charging, switches SW1 and SW2 are both ON and the potential of pilot signal CPLT is V3 (e.g., 6 V), and thus, pilot signal CPLT is in the oscillating state. By switching both of switches SW1 and SW2 from this state to the OFF state, the potential of pilot signal CPLT changes to V1 (e.g., 12 V), and thus, pilot signal CPLT is switched from the oscillating state to the non-oscillating state (refer to FIG. 3). In the present embodiment, by switching both of switches SW1 and SW2 to the OFF state, CCID relay 450 is turned off, and thus, the external charging current is also interrupted.

By executing the noise suppression process like the aforementioned processes (A) to (C), the communication noise generated from AC power lines ACL1 and ACL 2 and control pilot line L1 is suppressed.

ECU 300 executes the aforementioned smart verification process during execution of the aforementioned noise suppression process, and determines whether the result thereof is "smart verification is possible" or not (S14). If smart verification is possible (YES in S14), ECU 300 switches the state of cable lock mechanism 50 (S12). On the other hand, if smart verification is impossible (NO in S14), ECU 300 does not accept operation of cable lock switch 10 and ends the process.

As described above, in the present embodiment, the smart verification process is executed during the noise suppression process, and thereby, the smart verification process (communication with electronic key 30) can be normally executed without any influence of the noise. Therefore, the state of cable lock mechanism 50 can be appropriately switched in accordance with the result of the smart verification process (the result of communication with electronic key 30).

While description has been given in the present embodiment to the case in which the external power is the AC power, the present invention is also applicable to the case in which the external power is the DC power. Specifically, the noise may be generated when the external power is the DC power, and thus, the state of cable lock mechanism 50 can be appropriately switched by applying the present invention to suppress the noise.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST

1 vehicle; 2 charging lid; 10 cable lock switch; 20 antenna; 30 electronic key; 31 user; 50 cable lock mechanism; 51 actuator; 52 lock bar; 100 battery; 200 charger; 220 inlet; 221 protrusion; 230, 530 PLC communication unit; 300 ECU; 310 CPU; 320 resistance circuit; 330, 340 input buffer; 350 power supply node; 360 vehicle earth; 400 charging cable; 410 connector; 411 link; 412 shaft; 414 spring; 415 operation unit (push button); 420 plug; 440, ACL1, ACL2 AC power line; 450 CCID relay; 460 CCID control unit; 470 control pilot circuit; 471 electromagnetic coil; 472 oscillation device; 473, 481 voltage sensor; 480 leakage detector; 482 current sensor; 500 external power supply device; 510 AC power source; 520 outlet; L1 control pilot line; L3 connection signal line; R1, R2 pull-down resistance; R10 pull-up resistance; R20 resistance; SW1, SW2, SW20 switch.

The invention claimed is:

1. A vehicle capable of executing external charging in which a vehicle-mounted power storage device is charged using electric power supplied from a charging cable external to the vehicle, the vehicle comprising:

an inlet configured to be connectable to said charging cable;

a cable lock mechanism provided near said inlet and being capable of switching between a lock state in which said charging cable cannot be removed from said inlet and an unlock state in which said charging cable can be removed from said inlet;

a cable lock switch provided near said inlet and outputting a signal for requesting switching of a state of said cable lock mechanism in accordance with user's operation;

an antenna provided near said inlet and being capable of receiving a signal from an electronic key located within a prescribed range; and a control device capable of executing a verification process for determining whether a verification condition that the electronic key located within said prescribed range is an authorized user's key is satisfied or not based on information received by said antenna, wherein said control device executes a noise suppression process for suppressing a noise caused by said external charging, when said cable lock switch is operated; executes said verification process during said noise suppression process; and switches the state of said cable lock mechanism when it is determined by said verification process that said verification condition is satisfied, said control device executes a first verification process when said cable lock switch is operated, switches the state of said cable lock mechanism without executing said noise suppression process, when it is determined by said first verification process that said verification condition is satisfied, and executes said noise suppression process when it is determined by said first verification process that said verification condition is not satisfied; executes a second verification process during said noise suppression process; switches the state of said cable lock mechanism when it is determined by said second verification process that said verification condition is satisfied; and does not switch the state of said cable lock mechanism when it is determined by said second verification process that said verification condition is not satisfied.

2. The vehicle according to claim 1, wherein said noise suppression process is a process for reducing a current supplied from said charging cable, and thereby, suppressing the noise generated from a power line between said charging cable and said vehicle.

3. The vehicle according to claim 2, further comprising a charger provided between said inlet and said power storage device, wherein said noise suppression process includes a process for controlling said charger, and thereby, reducing the current supplied from said charging cable.

4. The vehicle according to claim 2, wherein a relay capable of being opened and closed by said control device is provided on the power line in said charging cable, and said noise suppression process includes a process for controlling said relay in said charging cable to be opened, and thereby, preventing the current from flowing between said charging cable and said vehicle.

5. The vehicle according to claim 1, wherein said charging cable includes an oscillation circuit outputting a pilot signal to said control device, the pilot signal being switched to an oscillating state or a non-oscillating state by said control device, and said noise suppression process is a process for bringing, into the non-oscillating state, said pilot signal inputted from said oscillation circuit in said charging cable via a control signal line, and thereby, suppressing the noise generated from said control signal line.

* * * * *